Patented Aug. 18, 1942

2,293,034

UNITED STATES PATENT OFFICE 2,293,034

PEST CONTROL COMPOSITION

William Moore, Stamford, Conn., assignor to American Cyanamid Company, New York, N. Y., a corporation of Maine No Drawing. Application May 22, 1941, Serial No. 394,626

5 Claims. (Cl. 167—22)

The present invention relates to pest control compositions and is concerned more particularly with a class of compounds of exceptional activity for the control of insects and allied pests.

I have discovered that the organic esters of substituted glycines provide a particularly new and effective means for controlling harmful lower forms of life such as insects, bacteria, fungi, etc., which prey on living and non-living organic matter. In particular, they function excellently as contact poisons since they possess a combination of desirable properties, i. e. high toxicity, ability to be dispersed in water easily, and unusual penetrability into insects.

The compounds contemplated for use as pest-control agents in my invention may be characterized by the general formula:

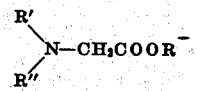

wherein R is a member of the group consisting of aryl, aralkyl, alkyl and alkoxyalkyl radicals, R' is a member of the group consisting of —CH$_2$COOR, alkyl, aryl, aralkyl, alkoxyalkyl, cycloaliphatic and heterocyclic radicals, and R" is a member of the group consisting of —CH$_2$COOR, hydrogen, alkyl, aryl, aralkyl, alkoxyalkyl, cycloaliphatic and heterocyclic radicals.

As showing the wide diversity of these compounds, the following may be mentioned: ethyl diphenylaminoacetate, n-butyl diphenylaminoacetate, isoamyl diphenylaminoacetate, 2-ethyl butyl diphenylaminoacetate, n-hexyl diphenyl aminoacetate, n-octyl diphenylaminoacetate, n-dodecyl diphenylaminoacetate, methyl benzylphenylaminoacetate, n-butyl benzylphenylaminoacetate, n-octadecyl benzylphenylaminoacetate, n-octyl dibenzylaminoacetate, n-tetradecyl dibenzylaminoacetate, phenyl diisoamylaminoacetate, phenyl di-n-octylaminoacetate, benzyl di-n-propylaminoacetate, benzyl diphenylaminoacetate, ethyl di-n-butylaminoacetate, n-amyl di-n-dodecylaminoacetate, β-butoxyethyl diphenyl-aminoacetate, β-methoxyethyl dibenzylaminoacetate, n-butyl phenylaminoacetate, n-octyl benzylaminoacetate, β-butoxyethyl phenylaminoacetate, ethyl n-dodecylaminoacetate, phenyl n-butyl-aminoacetate, benzyl n-octylaminoacetate, propyl furfurylaminoacetate, ethyl 2-piperidylaminoacetate, n-hexyl di-β-butoxyethylaminoacetate, benzyl di-β-methoxyethylaminoacetate, n-butyl di-2-piperidylaminoacetate, ethyl difurfurylaminoacetate, isoamyl dicyclohexylaminoacetate, benzyl dicyclohexylaminoacetate, 1,1',dicarboxylpropyldimethyl amine, 1,1',dicarboxylhexyldimethyl amine, 1,1',dicarboxylamyldimethylcyclohexyl amine, 1,1',dicarboxylbutyldimethyl phenyl amine, 1,1',dicarboxyloctyldimethyl benzyl amine, 1,1',1",tricarboxylbutyltrimethyl amine, 1,1',1",tricarboxyl-2-isohexyltrimethyl amine.

The following examples, in which the parts are by weight, illustrate general methods of preparing the above compounds in accordance with the invention.

Example 1

17 parts of hydrogen chloride gas were slowly passed into a mixture consisting of 41.6 parts of diphenylglycinonitrile and 270 parts of n-hexyl alcohol heated on a steam bath. After heating for 6 hours, the liquid reaction mixture was cooled to room temperature (20° C.), washed with water, then with 5% sodium carbonate solution and again with water. After distilling off the excess hexyl alcohol, the product was fractionated in vacuo. The n-hexyl diphenylaminoacetate was obtained as a light yellow colored oil boiling at 160–165° C. at 1–2 mm.

Example 2

A mixture consisting of 25.8 parts of sodium diphenylaminoacetate, 15.1 parts of benzyl chloride and 100 parts of benzyl alcohol (solvent) was heated under reflux for one hour at a temperature of approximately 170° C. The reaction mixture was cooled, washed with 5% sodium hydroxide solution, and then with water. After removing the benzyl alcohol, the product was distilled in vacuo. The benzyl diphenylaminoacetate was obtained as a light yellow colored oil boiling at 170° C. at 0.5 mm.

Example 3

85 parts of phenyl chloracetate and 157 parts of diamyl amine were mixed together and warmed on a steam bath. In about 15 minutes the temperature rose to 110° C. The mixture was cooled with an ice-water bath in order to hold the temperature below 120° C. After about 10 minutes the temperature began to drop and the reaction mixture was flooded with water. The product, which separated from the water as an oil, was distilled in vacuo. The phenyl diamylaminoacetate was obtained as a light green colored oil boiling at 123° C. at 0.5 mm.

Example 4

A mixture consisting of 225 parts of butyl chloroacetate, 184 parts of benzylaniline and 100 parts of sodium bicarbonate was stirred and heated in a vessel fitted with a thermometer, stirrer and reflux condenser. At a temperature of 150° C., carbon dioxide and water were given off, the latter being removed by means of a side-trap at the base of the condenser. In approximately two hours the temperature of the reaction mixture rose to 185° C. and the evolution of carbon dioxide decreased rapidly. Heating was continued at 185° C. for four hours. The product was cooled, washed with water and distilled in vacuo. 330 parts (92% of theory) of butyl benzylphenylaminoacetate, a colorless oil, were obtained, boiling at 140–145° C. at 0.5 mm.

*Example 5*

20 parts of dicyanomethyl cyclohexyl amine dissolved in 50 parts of n-amyl alcohol were added slowly to 100 parts of n-amyl alcohol in which were dissolved 20 parts of hydrogen chloride. The mixture was heated on a steam bath for six hours, then cooled to room temperature (20° C.), washed with water, washed with 5% sodium carbonate solution, and again with water. After distilling off the excess amyl alcohol, the product was fractionated in vacuo. The 1,1',dicarboxyl-amyldimethyl cyclohexyl amine was obtained as a colorless oil boiling at 160° C. at 0.5 mm.

*Example 6*

A rapid stream of hydrogen chloride gas was passed into a mixture consisting of 13.4 parts of tricyanomethyl amine and 74 parts of n-butyl alcohol heated on a steam bath for a period of two hours. The reaction mixture was further heated for twelve hours on the steam bath, then cooled and washed according to the procedure followed in Example 5. The excess butyl alcohol was removed and the product distilled in vacuo. 32.5 parts (90% of theory) of 1,1', 1'',tricarboxyl-butyltrimethyl amine, a light yellow colored oil, were obtained boiling at 145° C. at 0.5 mm.

Water emulsions of the compounds were prepared using dioctyl sodium sulphosuccinate (1–5000 dilution) as the emulsifier and wetting agent. Table I shows typical kills obtained when sprays of the emulsions in various dilutions were used against citrus red spiders and adult mealy bugs.

*Table I*

| Insect | Compound | Dilution | Per cent kill |
|---|---|---|---|
| Citrus red spider | Ethyl diphenylaminoacetate | 1–500 | 100 |
| Do | do | 1–1,000 | 91.7 |
| Do | n-Butyl diphenylaminoacetate | 1–500 | 100 |
| Do | do | 1–1,000 | 97.5 |
| Do | Isoamyl diphenylaminoacetate | 1–500 | 100 |
| Do | do | 1–1,000 | 92.6 |
| Do | 2-ethylbutyl diphenylaminoacetate | 1–500 | 100 |
| Do | do | 1–1,000 | 98.2 |
| Do | do | 1–2,000 | 68.7 |
| Do | 2-isohexyl diphenylaminoacetate | 1–500 | 100 |
| Do | do | 1–1,000 | 92.7 |
| Do | do | 1–2,000 | 78.2 |
| Do | n-Hexyl diphenylaminoacetate | 1–750 | 100 |
| Do | n-Octyl diphenylaminoacetate | 1–500 | 100 |
| Do | do | 1–1,000 | 98.7 |
| Do | do | 1–2,000 | 89.5 |
| Do | n-Dodecyl diphenylaminoacetate | 1–500 | 94.5 |
| Do | Benzyl diphenylaminoacetate | 1–750 | 100 |
| Do | do | 1–1,500 | 98.6 |
| Do | β-Butoxyethyl diphenylaminoacetate | 1–500 | 100 |
| Do | do | 1–1,000 | 95.3 |
| Do | do | 1–3,000 | 66.0 |
| Do | Butyl benzylphenylaminoacetate | 1–500 | 100 |
| Do | do | 1–1,000 | 98.9 |
| Do | do | 1–2,000 | 90.2 |
| Do | do | 1–4,000 | 72.5 |
| Citrus red spider | 2-isohexyl benzylphenylaminoacetate | 1–500 | 100 |
| Do | do | 1–1,000 | 99.4 |
| Do | do | 1–2,000 | 93.8 |
| Do | do | 1–4,000 | 74.3 |
| Do | Isoamyl dicyclohexylaminoacetate | 1–500 | 94.1 |
| Do | n-Butyl isoamylphenylaminoacetate | 1–500 | 98.1 |
| Do | Phenyl diisoamylaminoacetate | 1–500 | 100 |
| Do | do | 1–1,000 | 89.8 |
| Do | 1,1',dicarboxylamyldimethyl cyclohexylamine | 1–500 | 100 |
| Do | 1,1',dicarboxylbutyldimethyl phenylamine | 1–500 | 90.3 |
| Do | do | 1–1,000 | 79.6 |
| Do | 1,1',1'',tricarboxylbutyltrimethylamine | 1–500 | 79.5 |
| Do | 1,1',1'',tricarboxyl-2-isohexyl-trimethylamine | 1–500 | 100 |
| Do | do | 1–1,000 | 96.6 |
| Do | do | 1–2,000 | 62.1 |
| Adult mealy bug | n-Propyl diphenylaminoacetate | 1–200 | 87 |
| Do | n-Butyl diphenylaminoacetate | 1–400 | 92.1 |
| Do | do | 1–800 | 80.3 |
| Do | Isoamyl diphenylaminoacetate | 1–200 | 95.3 |
| Do | 2-ethylbutyl diphenylaminoacetate | 1–200 | 91.3 |
| Do | do | 1–400 | 79.2 |
| Do | n-Butyl benzylphenylaminoacetate | 1–400 | 90.0 |
| Do | do | 1–800 | 73.7 |

Spray solutions were prepared by dissolving the compounds in a solvent medium consisting of 65% acetone and 35% water. Table II shows typical kills obtained under comparable conditions when the sprays were used against black bean aphids.

*Table II*

| Compound | Dilution | Per cent kill |
|---|---|---|
| Methyl diphenylaminoacetate | 1–500 | 94 |
| n-Propyl diphenylaminoacetate | 1–500 | 96 |
| Do | 1–1,000 | 86.6 |
| n-Butyl diphenylaminoacetate | 1–500 | 98.8 |
| Do | 1–1,000 | 92.4 |
| Isoamyl diphenylaminoacetate | 1–500 | 100 |
| Do | 1–1,000 | 96.5 |
| 2-ethylbutyl diphenylaminoacetate | 1–500 | 100 |
| Do | 1–1,000 | 75.3 |
| Isoamyl dicyclohexylaminoacetate | 1–500 | 98 |
| Do | 1–1,000 | 96.5 |

Heretofore, most pest-control agents have shown a wide difference of toxicity in combating citrus red spider mites as compared to the effect on their eggs. In many instances the pest-control substance would destroy the mite and then be found substantially non-toxic to its eggs. The compounds of the present invention have proven to be equally effective on both the mite and its eggs as shown by the percentage-kills given in Table III. Typical compounds were applied in water emulsion sprays using dioctyl sodium sulphosuccinate (1–5000 dilution) as the emulsifying agent.

*Table III*

| Compound | 1–500 dilution | | 1–1,000 dilution | | 1–2,000 dilution | |
|---|---|---|---|---|---|---|
| | Mites | Eggs | Mites | Eggs | Mites | Eggs |
| | Per cent | Per cent | Per cent | Per cent | Per cent | Per cent |
| Butyl benzylphenylaminoacetate | 100 | 100 | 98.9 | 97.7 | 90.2 | 91.8 |
| 2-isohexyl benzylphenylaminoacetate | 100 | 100 | 99.4 | 97.8 | 93.8 | 78.3 |

These compounds may also be used in conjunction with other pest-control agents to increase their effectiveness on insects. Table IV shows the kills obtained when the pest-control agents were applied in water emulsions to the citrus red spider mites.

Table IV

| Pest control agent | Dilution | Per cent kill |
|---|---|---|
| Butyl benzylphenylaminoacetate | 1-1,000 | 98.9 |
| Do | 1-2,000 | 90.2 |
| Do | 1-4,000 | 72.5 |
| Derris resin | 1-1,000 | 100 |
| Do | 1-3,000 | 91.2 |
| Do | 1-10,000 | 70.4 |
| Do | 1-20,000 | 47.1 |
| 98 parts by wt. of butyl benzylphenylaminoacetate, 2 parts by wt. derris resin | 1-10,000 | 100 |
| Do | 1-20,000 | 95.2 |
| Do | 1-40,000 | 53.5 |

Although the compounds of this invention are especially effective as contact insecticides, they may be of assistance also in preventing bacterial and fungal putrefaction of proteins, such as gelatin, glue, starch pastes, leather, cellulosic materials, casein products, and other natural or manufactured products that are subject to attack or decomposition by various bacteria and molds. They may be used also for the control of fungous diseases on seeds and living plants.

In their application, it may be preferable or desirable to combine these compounds with supplementary agents such as absorbent bodies, dispersing agents, sticking agents, and the like. They may be applied as solutions in organic solvents, in aqueous dispersions, or in dusts with such inert solid diluents as walnut shell, wood flour, talc, and the like.

The term, "pest-control composition," as used herein and in the appended claims, shall be construed as a preparation useful for insecticidal, fungicidal, bactericidal and analogous purposes.

While the invention has been described with particular reference to specific embodiments, it is to be understood that it is not to be limited thereto but is to be construed broadly and restricted solely by the scope of the appended claims.

I claim:

1. A pest-control composition containing a toxic amount of a compound of the general formula:

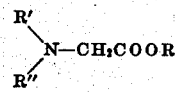

wherein R is a member of the group consisting of aryl, aralkyl, alkyl and alkoxyalkyl radicals, R' is a member of the group consisting of —CH₂COOR, alkyl, aryl, aralkyl, alkoxyalkyl, cycloaliphatic and heterocyclic radicals, and R" is a member of the group consisting of —CH₂COOR, hydrogen, alkyl, aryl, aralkyl, alkoxyalkyl, cycloaliphatic and heterocyclic radicals.

2. A pest-control composition containing a toxic amount of an organic ester of an N-substituted glycine.

3. A pest-control composition containing a toxic amount of butyl benzylphenylaminoacetate.

4. A pest-control composition containing a toxic amount of benzyl diphenylaminoacetate.

5. A pest-control composition containing a toxic amount of phenyl diisoamylaminoacetate.

WILLIAM MOORE.